United States Patent
Broaddus et al.

(10) Patent No.: US 9,147,251 B2
(45) Date of Patent: Sep. 29, 2015

(54) SYSTEMS AND METHODS FOR EFFICIENT 3D TRACKING OF WEAKLY TEXTURED PLANAR SURFACES FOR AUGMENTED REALITY APPLICATIONS

(75) Inventors: Christopher Broaddus, Jersey City, NJ (US); Andriy Grygorenko, Yuzhny Odessa (UA); Netanel Hagbi, Be'er Sheva (IL); Oriel Y. Bergig, D.N. Lachis (IL)

(73) Assignee: Flyby Media, Inc., New York, NY (US)

( * ) Notice: Subject to any disclaimer, the term of this patent is extended or adjusted under 35 U.S.C. 154(b) by 347 days.

(21) Appl. No.: 13/566,921

(22) Filed: Aug. 3, 2012

(65) Prior Publication Data

US 2014/0037137 A1    Feb. 6, 2014

(51) Int. Cl.
 G06K 9/00    (2006.01)
 G06T 7/00    (2006.01)
 G06T 7/20    (2006.01)

(52) U.S. Cl.
 CPC ............... *G06T 7/004* (2013.01); *G06T 7/204* (2013.01); *G06T 2207/10016* (2013.01); *G06T 2207/20016* (2013.01); *G06T 2207/20076* (2013.01); *G06T 2207/30244* (2013.01)

(58) Field of Classification Search
 CPC ........... G06T 2207/10016; G06T 2207/20016; G06T 2207/20076; G06T 2207/30244; G06T 7/004; G06T 7/204
 USPC ................................................. 382/103, 276
 See application file for complete search history.

(56) References Cited

U.S. PATENT DOCUMENTS

| | | | |
|---|---|---|---|
| 2009/0245692 A1 | 10/2009 | Okutomi et al. | |
| 2010/0002909 A1* | 1/2010 | Lefevre et al. | 382/103 |
| 2012/0086727 A1 | 4/2012 | Korah et al. | |
| 2012/0121161 A1* | 5/2012 | Eade et al. | 382/153 |
| 2013/0148851 A1* | 6/2013 | Leung et al. | 382/103 |
| 2014/0028850 A1* | 1/2014 | Keating et al. | 348/158 |

OTHER PUBLICATIONS

Klein Georg et al. *Parallel Tracking and Mapping on a Camera Phone*, IEEE, International Symposium on Mixed and Augmented Reality, 2009, pp. 83-86.
Pirchheim Christian et al., *Homography-Based Planar Mapping and Tracking for Mobile Phones* IEEE International Symposium on Mixed and Augmented Reality, 2011, pp. 27-36.
Patent Office of Russia, International Search Report (dated Dec. 19, 2013), issued in PCT Application No. PCT/US2013/053500.

* cited by examiner

*Primary Examiner* — Tom Y Lu
(74) *Attorney, Agent, or Firm* — Fish & Richardson P.C.

(57) ABSTRACT

The present system provides an on the fly simple to complex 6DOF registration approach using the direct method. On the fly means it does not require training time, a user points a phone/camera to a planar surface and can start tracking it instantly. Simple to complex means the system performs registration in multiple levels of complexity from 2DOF to 6DOF. By increasing the complexity model the system enables more surfaces to be tracked and for surfaces that are tracked the system can avoid local minima solution providing a more robust and accurate 6DOF tracking. Even surfaces that are very weak in features can be tracked in 6DOF and virtual content can be registered to them. The system enables playing Augmented Reality games on low-end devices such as mobile phones on almost any surface in the real world.

9 Claims, 6 Drawing Sheets

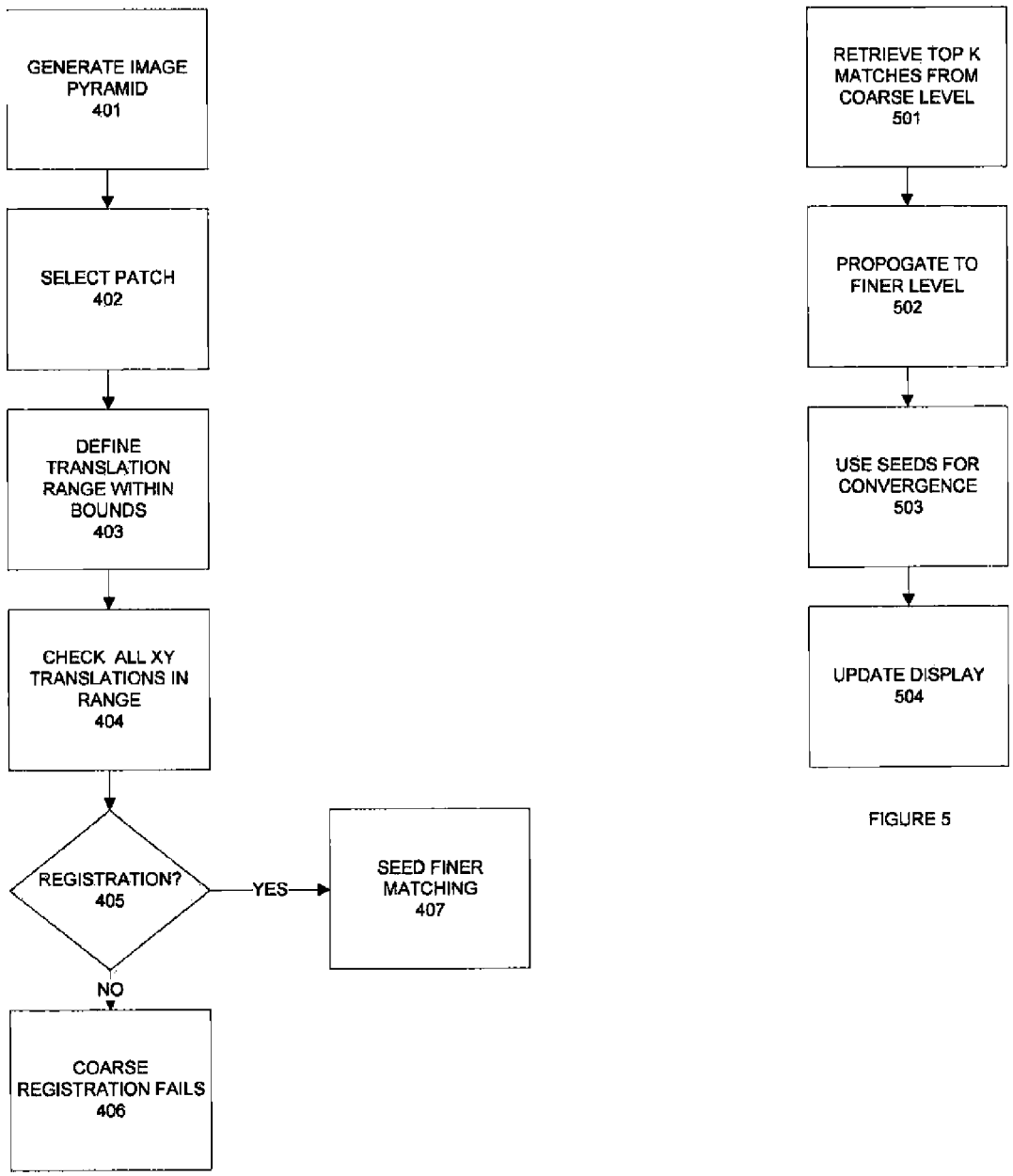

SYSTEMS AND METHODS FOR EFFICIENT 3D TRACKING OF WEAKLY TEXTURED PLANAR SURFACES FOR AUGMENTED REALITY APPLICATIONS

BACKGROUND

It is sometimes desired to allow a person to combine virtual reality with a real world surface. For example, a user may point the camera of a computer or smart-phone or tablet at a wall and the wall will appear on the display of the camera device. In addition, some virtual object will appear in the image as well, and appear as if it is part of the real world environment, such as, for example, a basketball hoop appearing to be affixed to the wall. This is referred to as Augmented Reality.

Augmented Reality is a process that combines Computer Vision and Computer Graphics to present augmented information on view of the real world. It creates the illusion that the added information resides in the real world. This information can be helpful for applications such as navigation, education, entertainments and games.

To achieve accurate registration of information, Computer Vision methods are used to register regions of interest between camera frames. Based on those registered regions the desired information is registered. The Computer Vision method will usually try to estimate the camera pose in real time.

When triggering an application on a certain surface in order to see augmented information on that surface it is possible to calculate the relative camera pose between the pose of the camera when the application was triggered to its poses in consecutive camera frames. When the information presented is 3D content it is extremely important to register the camera frames correctly (which are 2D by nature). Small errors in the 2D registration will be reflected in large misalignments of the 3D content. Augmented Reality applications are real time applications by their nature. In real time applications computation speed and efficient algorithms are extremely important.

Augmented Reality applications and applications for entertainment and games are usually targeting a mass audience. In those cases it cannot be assumed the user is trained by any mean to use the application. It follows the registration should work on many different surfaces and in many different realistic scenarios.

The registration process used for Augmented Reality on planar surfaces is known as planar tracking or homography tracking. In the past, planar tracking or homography tracking has been done in contexts such as aligning different patches taken from space satellites. In Augmented Reality the goal in many cases is displaying 3D content registered in real time to a real world surface or environment. One prior art approach tries to identify strong local features in the image (such as corners) and track those local features as the camera is moving to register the image. With a sizable amount of local features on the real world surface, it is possible to track the plane reliably and in real time. The local features approach can only work on surfaces that are well textured which limits the usability of the application.

Another approach (sometime called the direct approach) tries to use all the pixels in the image and match between frames. The methods using the direct approach tend to be computationally intensive and are typically unable to deal with significant illumination changes. In addition, the approach has been limited in the number of degrees of freedom (DOF) that are available.

Six degrees of freedom registration means the relation between the camera and the planar surface on which information is being augmented is practically the full range of motions one can expect and in particular: moving the camera up and down, left and right, forward and backward and tilting it both in rotation and skewed angles with respect to the surface being imaged. The same applies the other way around meaning moving the surface with respect to the camera. 2DOF registration accommodates only for a limited set of motions and in particular up and down and left and right. Different degrees of freedom can be defined in between these two but only 6DOF supports the full set of motions that can be done in reality.

Only a few efforts have been done to register content to a plane in 6DOF using the direct approach and most of the existing work registers with less than 6DOF. The existing 6DOF methods are usually sensitive to local minima which means they fail for no visible reasons as the camera moves around. Existing 6DOF methods are usually theoretical and have not matured to robust products that are stable and can support a system for the mass market. Existing 6DOF methods have not applied a gradually growing complexity model (from 2DOF to 6DOF) so given a surface they will either work or not depending on the appearance of the plane limiting the amount of surfaces around us that can be used to trigger the augmented experience.

SUMMARY

The present system provides an on the fly simple to complex 6DOF registration approach using the direct method. On the fly means it does not require training time, a user points a phone/camera to a planar surface and can start tracking it instantly. Simple to complex means the system performs registration in multiple levels of complexity from 2DOF to 6DOF. By increasing the complexity model the system enables more surfaces to be tracked and for surfaces that are tracked the system can avoid local minima solution providing a more robust and accurate 6DOF tracking. Even surfaces that are very weak in features can be tracked in 6DOF and virtual content can be registered to them. The system enables playing Augmented Reality games on low-end devices such as mobile phones on almost any surface in the real world. The tracking starts instantaneously without any need for pre-training.

These and further embodiments will be apparent from the detailed description and examples that follow.

BRIEF DESCRIPTION OF THE DRAWINGS

The present system is herein described, by way of example only, with reference to the accompanying drawings, wherein:

FIG. 4 is a flow diagram illustrating a coarse matching step of an embodiment of the system.

FIG. 5 is a flow diagram of a fine matching step of an embodiment of the system.

DETAILED DESCRIPTION

The present system is a method for tracking the three-dimensional camera viewpoint from a two-dimensional camera video stream of a textured planar surface for Augmented Reality applications. Augmented Reality applications require accurate registration between the camera pose and a surface for rendering three-dimensional models. Surfaces imaged by a camera may contain distinguished features commonly used in Computer Vision for tracking and recognizing images. In operation, the user points a phone at a planar surface, taps the screen (or it triggers automatically) and 3D virtual content appears registered to that surface. When the phone is moved in all directions the 3D virtual content is seen from all its angles, as would be expected from a similar real 3D object on that surface. It can work on weakly textured surfaces as well as on strongly textured ones.

The system is able to operate even when the surface is "weakly" textured. Weakly textured surfaces are surfaces that when analyzed in a video stream have a sparse set of distinguishing features. The number and the spatial distribution of those features is generally limited.

The present system does not rely on key-points and instead matches the entire inspection image to a reference image. Depending on the embodiment, the entire image can be used for registration or it can be divided to regions or patches.

The method provides stable tracking by utilizing relatively small fixed amount of computation cycles. This is achieved by matching of the reference patch to an inspection patch with a coarse-to-fine strategy. This allows for small displacement in the translational parameters at every level, which sums up to a constant and small number of operations. The method is capable of running on a low power mobile phone in real-time.

The system does not require a training stage. This allows the user to track a target of interest with immediate 6DOF pose feedback, referred to herein as "On the Fly" tracking.

Overview of Operation

Figure 2:
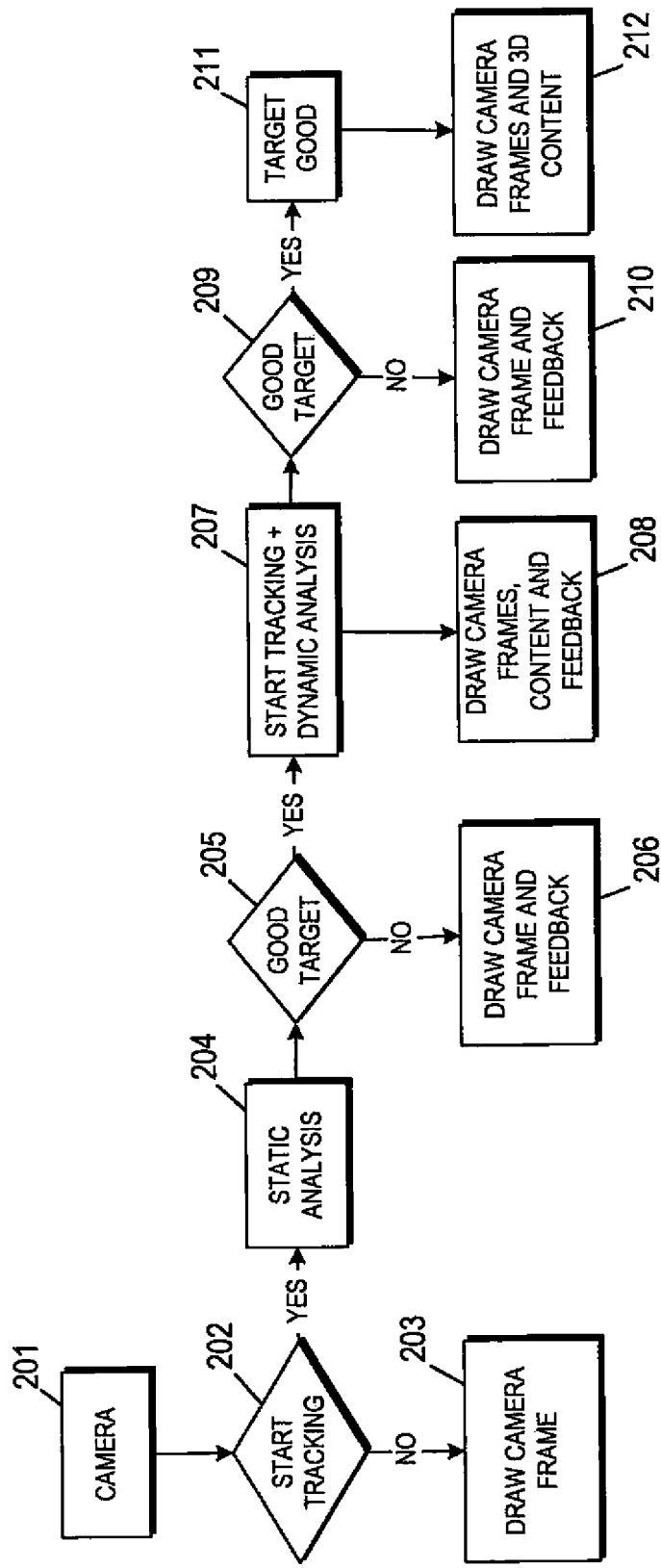
FIG. 2 is a flow diagram of an overview of the operation of an embodiment of the system.

FIG. 2 is a flow diagram illustrating the operation of an embodiment of the system. At step 201 the user invokes the camera of a device such as a smart-phone. At decision block 202 it is determined if the system is in tracking mode and should start tracking. If not, the system draws the camera frame at step 203 (i.e. the view from the camera is presented on the display of the camera or other device).

If tracking is invoked at step 202, the system proceeds to step 204 and performs a static analysis of the image. At decision block 205 it is determined if the image is a good target. If not, the system renders the camera frame and provides feedback to the user at step 206. If the target is good at decision block 205, the system proceeds to step 207 to begin tracking and dynamic analysis.

In parallel with step 207, the system provides feedback and renders the camera frame and associated content to the user at step 208. At decision block 209 it is again determined if the target is good. If not, the system renders the camera frame and provides user feedback.

If it is a good target at decision block 209, the system notifies the application that the target is good at step 211 and renders the camera frames and 3D content at step 212.

Tracking

Figure 3:
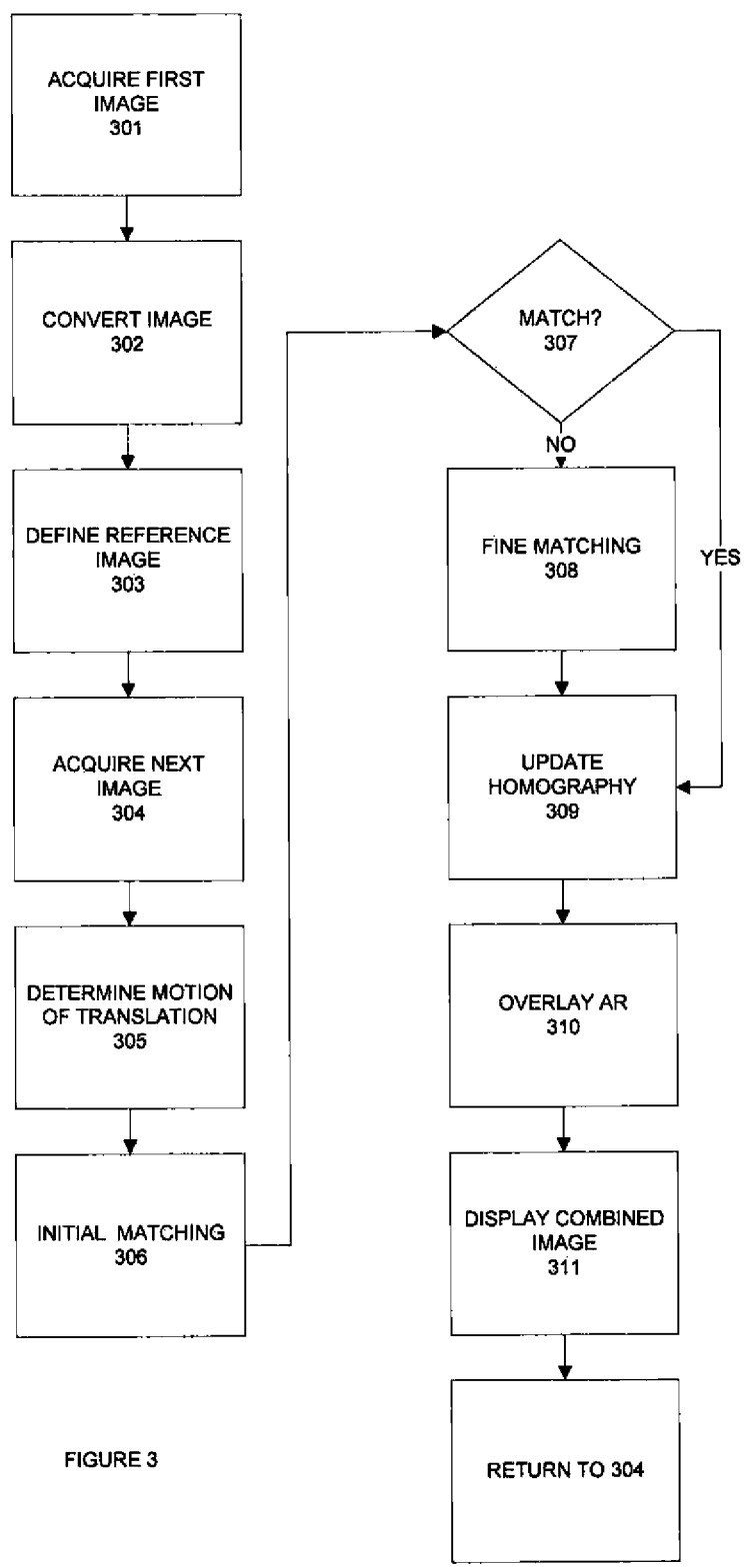
FIG. 3 is a flow diagram of an overview of an embodiment of the 6DOF operation of the system.

FIG. 3 is a flow diagram illustrating the tracking operation of the system. At step 301 the system acquires the first image (e.g. frame). In one embodiment the system will use this frame as the reference frame for all subsequent operations. (In other embodiments the system may periodically reestablish a reference frame).

At step 302 the system converts the image into a form that makes it easier to compare subsequent images with fewer computation steps. At step 303 the system defines a reference image. This image may be the entire image itself, or it may be one or more reference patches from the first image.

At step 304 the system acquires the next image (e.g. frame) and determines the camera motion of translation in 2DOF at step 305. The system now attempts to determine the change in position of the camera by using the new frame and comparing it to the reference image. In one embodiment, the system does this in a staged effort so that eliminates subsequent steps when adequate information is gained.

At step 306 the system performs a first matching of the images to determine camera position and location in the 6DOF space based on the seed homography from the previous frame. It can also seed a position by using measurement units on the device such as from an onboard accelerometer and/or gyroscope. A combination of the two where the previous frame position is complemented with accelerometer and gyroscope data is also possible to seed the initial position.

At decision block 307 it is determined if there is a match. This means if the coarse step has determined the position of the camera. If there is not a good enough match at decision block 307, the system proceeds to fine matching step 308, using the result of the match as a seed for the next step. If not, registration fails.

After step 308, or if there had been a good match at step 307, the system updates the homography information at step 309. At step 310 the system constructs the combined real/AR image and displays it to the user at step 311. The system then returns to step 304 to acquire the next frame.

Coarse Matching

The coarse matching in the system may be done in a number of ways. One embodiment is illustrated in the flow diagram of FIG. 4. At step 401 the system takes the image frame that has been acquired and generates an image pyramid. At step 402 the system selects a patch from the image pyramid that the system will compare to the reference image. In one embodiment of the system the comparison will be based on the translation (in X and Y) of the new patch from the reference patch. At step 403 the system defines a translation range of movement in all directions of X and Y that will allow the system to find a match with an allowable time of computation for adequate overall system performance. Depending on the speed of the processor in the device being used, and other factors, the translation boundaries can vary.

At step 404 the system checks all XY translations in the defined range. At decision block 405 the system determines if there is registration between the patches. If so, the system seeds the finer matching techniques at step 407. Otherwise, registration failed at step 406.

Fine Matching

FIG. 5 is a flow diagram illustrating the fine matching approach of an embodiment of the system. At step 501 the system retrieves the top k matches from the coarse level process and uses one or more as seeds for the next process. In one embodiment, each translation analysis gives a score representing the degree of registration between the sample and the reference. If there is no registration at the coarse level, some number k of the top matches (within a certain range of similarity or simply the top k matches) are used to move to the finer levels of analysis. At step 502 each patch is propagated to a finer level of resolution. At step 503 the system solves an optimization problem using the seeds. After this step, the system updates the display at step 504.

Operation

Figure 1:
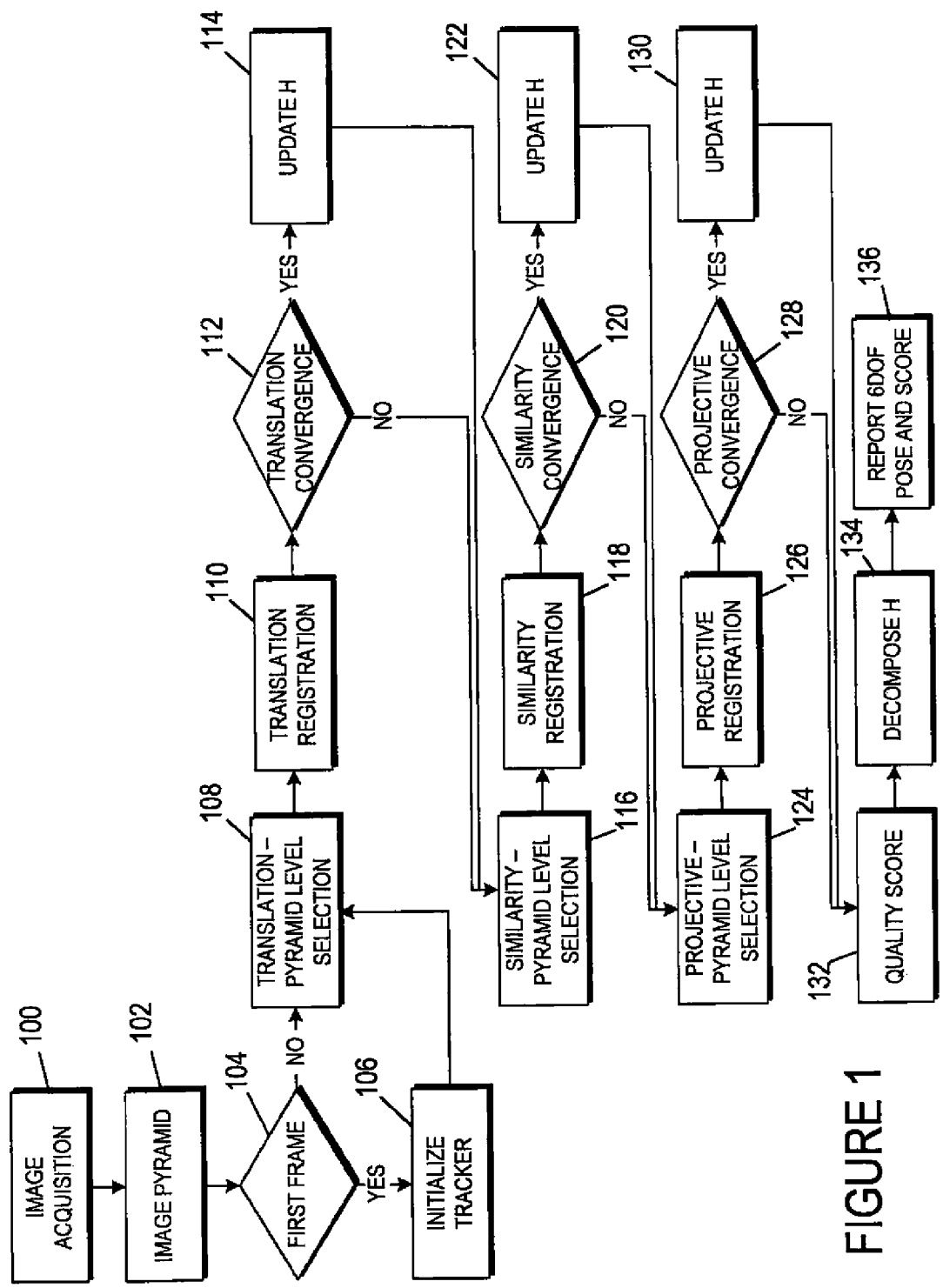
FIG. 1 is a flow diagram of the operation of an embodiment of the 6DOF operation of the system.

FIG. 1 is a flow diagram illustrating more detail of the operation of the system. During the discussion of the system we will refer to a Reference Image. This is an image taken at time zero and is used for registration and translation in subsequent operations when tracking the camera pose as it changes over time with respect to a planar surface. An Inspection Image is an image provide from the camera after the Reference Image. The system processes images after the reference image as inspection images. A Patch is a region within an image. The system matches patches between inspection images and reference images to perform tracking.

At step 100 the system acquires an image. This may be accomplished by the user invoking a camera (e.g. a smartphone camera) and pointing at a surface.

At step 102 the system performs a pyramid transform on the inspection video frame to generate an Image Pyramid. In one embodiment, the system generates a Gaussian Pyramid on the intensity channel.

At decision block 104 it is determined if the captured frame is the first frame. If the frame is the first frame a tracker is initialized at step 106. Initializing the tracker 106 consists of: setting the incoming frame as the reference image. This includes storing the reference image and calculating values for the image, including zero-mean image, the sum and sum-squared integral of the zero-mean image, and the like. The system also sets the homography to the identity matrix (to be updated in later stages). The system normalizes the reference image by converting it to a fixed size patch with a predefined patch size in a rage of 25×25 to 100×100 depending on the application. The system resizes from the Image Pyramid (as opposed to the source image). The level on the pyramid from which the resize takes place is one level finer than the desired scale.

When the frame is not the first frame at decision block 104, the system proceeds to step 108 and performs a Translation Pyramid Level Selection. Translation Pyramid Level Selection 108 results in a level in the Image Pyramid on which registration should be calculated. The selection is performed in one embodiment by calculating the determinant of the affine coefficients of the homography from the reference image to the inspection image. The level of the inspection image that makes this determinant close to unity is chosen.

The system then proceeds to step 110 for translation registration. This can be achieved with a normalized cross-correlation between the inspection patch and the reference patch. The system may perform a similar approach using a Zero-Mean Sum-Squared Difference (ZMSSD) similarity measure for computation efficiency. The system may employ a "brute-force" approach but on small list of possible solutions for matching an inspection patch and the reference patch. Each match results with a score and the system keeps the top K solution after performing non-maximum suppression on the matches. In one embodiment the system uses K in the range of 1 to 10.

The small list of possible solution for matching the inspection patch to the reference image is calculated by starting from the expected position of the inspection patch based on the homography calculated in the previous frame and testing all possible translations in x and y within a range. The range is chosen so the computation time is small enough to enable an Augmented Reality application to perform in real time. The range used for the search region in one embodiment is 6×6 to 48×48. Since the system performs Translation Registration on one of the coarse levels of the image pyramid, depending on the level chosen the actual search can range from 2×2 to 12×12 pixels, resulting in a relatively small number of tests that cover a large area of the image.

The system performs the ZMSSD by first warping the inspection patch by the reported Homography of the previous inspection image. While the camera may have moved with respect to the reference frame the method performs in run time and assumes the amount of changes in the pose can be captured by the brute-force approach. Note the system performs the first search on a coarse level.

The system then test for Translation Convergence at step 112 by translating the inspection image with the updated translation parameters and computing the Normalized Cross Correlation (NCC) score between the translated inspection image and reference image. If the Translation Registration NCC score is above a threshold the convergence test is satisfied.

If Translation Registration converges the system will update the Homography (H) with new translation parameters in Update H at step 114.

At step 116 the system performs a Similarity Pyramid Level Selection. This results in a level in the Image Pyramid on which similarity should be calculated. This is calculated with the same technique as Translation Pyramid Level Selection.

Similarity Registration step 118 is using the top-K matches from the Translation Registration operation as a seed for solving an optimization minimization problem. The system warps the inspection image with each of the K possible seeds. It then calculate a target function to measure the registration error as the normalized sum-squared intensity error between the warped inspection image and reference image. The free parameters of the target are the four degrees-of-freedom of a similarity transformation. It is possible to solve this function with methods like Gradient Decent, Gauss-Newton and Levenberg-Marquardt. In one embodiment the system performs Gauss-Newton to minimize the target function. The number of iterations to perform in the Gauss-Newton is kept in a range of 1 to 10 for consistent computation time. The range is chosen so the computation time is small enough to enable an Augmented Reality application to perform in real time. The iterations are terminated early if the incremental update is below a given threshold.

The system next tests for Similarity Convergence at step 120 by warping the inspection image with the updated similarity parameters and computing the Normalized Cross Correlation (NCC) score between the warped inspection image and reference image. If the score is improving compared to the Translation Conversion score the convergence test is satisfied.

If Similarity Registration converges then the Homography is updated at step 122 with new similarity parameters. Even if Similarity Registration does not converge and the Homography is not updated, the top-K solutions are kept and the system proceeds with them.

Projective Pyramid Level Selection is done next at step 124. This is calculated with the same technique as Translation Registration.

Projective Registration at step 126 is performed by minimizing a target function seeded with the result of the Similarity Registration. The objective function minimizes the normalized sum-squared intensity difference between the warped inspection image and reference image. The free parameters of the target function are the eight degrees-of-freedom of the Lie Group. It is possible to solve this function with methods like Gradient Decent, Gauss-Newton, Levenberg-Marquardt and Efficient Second Order Minimization (ESM). In one embodiment the system performs ESM on the target function. The number of iterations to perform in the ESM is kept in range of 1 to 5 for consistent computation time. The range is chosen so the computation time is small enough to enable an Augmented Reality application to perform in real time. The iterations are terminated early if the incremental update is below given threshold.

At decision block 128 the system tests for Projective Convergence by warping the inspection image with the updated similarity parameters and computing the Projective Registration NCC score between the warped inspection image and reference image. If the Projective Registration NCC score is improving compared to the Similarity Registration NCC score then the convergence test is satisfied. If the tests at 112, 120 and 128 are all negative, the system uses the same H that started with the seed from the previous frame. If the system fails a certain threshold number of times, the system switches to a tracking recovery mode.

If Projective Registration converges the Homography is updated with new projective parameters at step 130. If there is no convergence at step 128, or after the updating of H at step 130, the system then calculates a Quality Score at step 132. The quality score is calculated by warping the inspection image with the final optimized Homography and computing the NCC score with the reference patch. The reference pyramid level to compute the NCC score on is predefined to keep runtime efficiency.

Finally at step 134 the system will decompose the homography to rotation, translation, and normal parameters. This can be done with Singular Value Decomposition or closed-form methods. In one embodiment, the system performs the decomposition with a closed-form solution to recover two solutions where only one solution is physically possible. The normal parameter is also taken into account in Quality score 132.

The system reports the rotation, translation and score at step 136 so an application can project a 3D model in the camera view. Since the camera pose is updated at every frame and the system draws the camera image in the background this results in an Augmented Reality experience where the model appears to be registered in 3D (Six degrees of freedom) to the plane being tracked.

The registration strategy is coarse to fine. This allows for less computation to take place at each level. Since at the coarse level image features are sparse, false similarity scores are more common. This can be overcome by propagating the top-k matches at the coarse level to incrementally finer levels to resolve the ambiguity. At each finer level, the search window is reduced in size for efficiency. The match that consistently maintains good similarity scores is selected as the best candidate.

The inspection image is mapped into the reference image at each level of the reference pyramid. As the camera moves further from the target, the target has a smaller density on the image plane. Similarly, when the camera moves closer to the target, the target has a larger density on the image plane. Note that the system maintains an image pyramid for the inspection images and the reference images. The inspection level i of the inspection image is mapped to the level j of the reference image so that the target density is approximately the same.

The method described solves for the homography using a non-linear optimization procedure. The target function is expanded using Taylor series, which holds for small changes in inter-frame motion. Greater range of convergence can be achieved using a coarse-to-fine refinement of inter-frame motion. The image pyramid is one mechanism for dealing with large motion displacements. The inspection image, at level i, is warped into the reference patch using a prior estimate of the pose starting at reference pyramid level j. The inspection image level i is selected so that the scale between i and j is close to one. In the present method, the determinant of the affine coefficients is made close to one.

The method described recovers the eight free parameters of the homography that minimize the normalized sum-squared intensity difference between the reference patch and the warped inspection image. This complete parameter space for planar targets has several local minima that optimization algorithms are susceptible to if the initial estimate is poor, or too far away from the true minima. To circumvent this problem, a simple-to-complex parametric model approach is adopted. The simplest model would be a one-parameter model, and the most complex an eight-parameter model in the homography case. In one embodiment, the system has selected a subset of the parametric models, namely translation (2), similarity (4) and projective (8). The simplest parametric model is optimized at a coarse level and the optimized parameters are propagated into the Homography if they are proved to converge. The next reference image level is chosen to be more detailed than the previous one and incrementally the complexity of the model is increased. The goal in these steps is to provide a better estimate of the true minima for the next parametric model.

In one of the embodiments, the system keeps the reference frame constant to the one that was initialized. This avoids drift in the registration.

Alternate Embodiment

It is a desired property to avoid matching regions with no meaningful information. The system can track planar surfaces on-the-fly and handle partial occlusion, specularities, reflections and shadows. That means the system is performing all the necessary computation for tracking a given surface in run-time without prior knowledge about the surface to be tracked. In particular the system is not pre-calculating in an offline stage regions for tracking on the reference image. The system divides the reference image to a pool of sub-patches. The pool size can be 1 to 1000 sub-patches.

The system sub-divides the target image into smaller regions (sub-patches) that may be overlapping and have different sizes. There are many ways to sub-divide the target. In one embodiment, the system uses an efficient method based on quad-tree decomposition to discover the parts of the target that have information.

The quad-tree is formed by recursively dividing the target into four regions, and if a regions maximum minus minimum value is greater than a threshold, then it is further divided into four. In one embodiment, the quad-tree is applied to all levels of the reference pyramid to generate multi-scale 11×11 patches. In other embodiments quad tree is divided based on Fourier Transform analysis. In another embodiment quad tree is divided base on correlation of the regions to a warped version of itself sometime named auto-correlation.

The optimization method described for a single patch is applied to all the sub-patches using an M-estimator to solve for the Homography jointly. The M-estimator weights each sub-patch to handle partial occlusion, specularities, reflections and shadows. There is no assumption that all the sub-patches are visible in the image, which enables the camera to move close to the target.

The method weights sub-patches from the pool described above so that weak regions are weighted less than strong regions. There measures for determining the weight of a sub-patch based on appearance information and tracking reliability. The method suppresses poor regions so that accurate pose can be achieved under many conditions for an AR experience. In one embodiment, 1-100 sub-patches are dynamically chosen for tracking on every frame.

The appearance information for computing weights is a combination of the local distribution of gradients and self-similarity. The local distribution of gradients is measured using the eigenvalue ratio of the second moment matrix of the local gradients. The self-similarity score is a local NCC score within a window which measured how similar the surrounding texture is.

Figure 7:
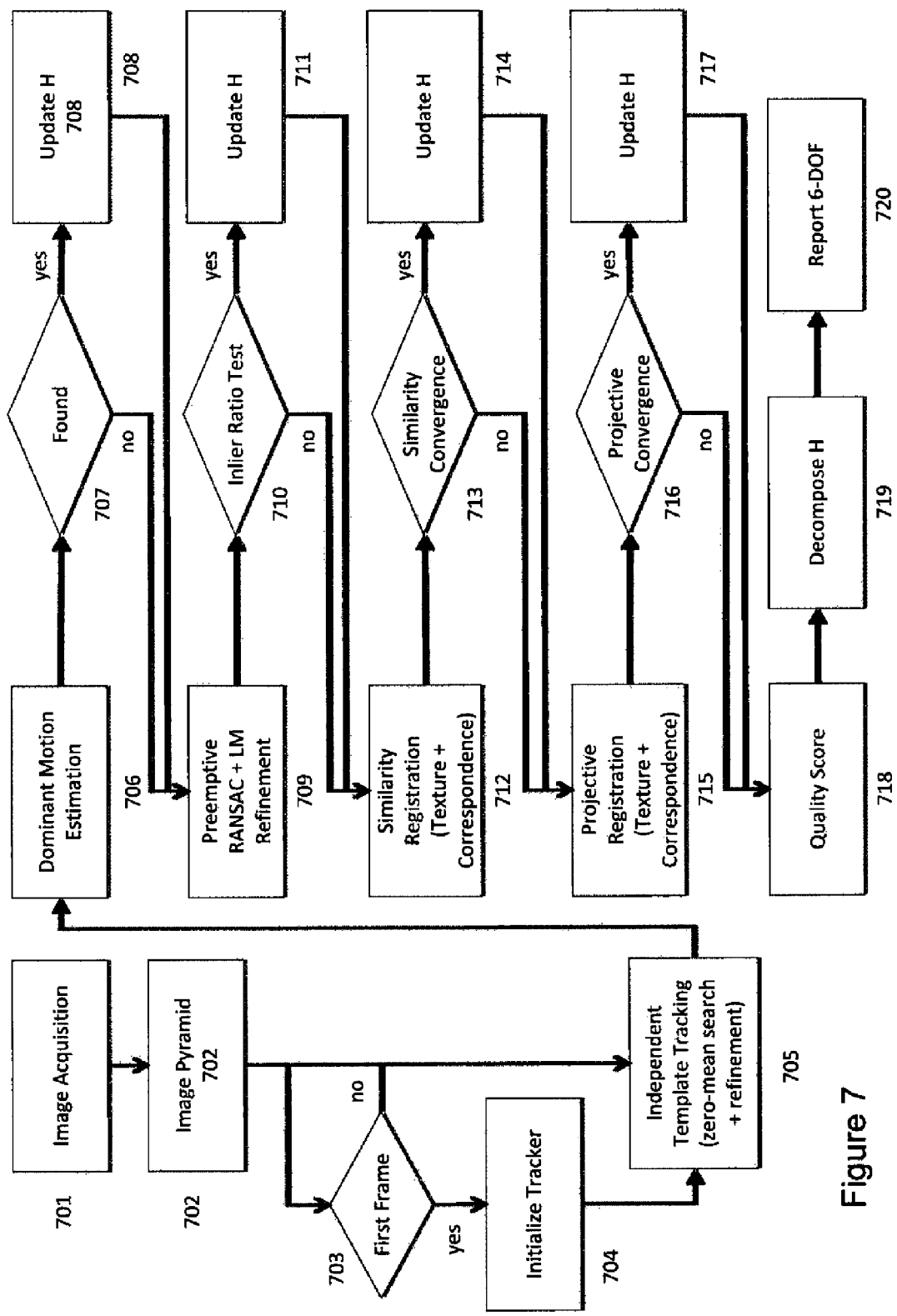
FIG. 7 is a flow diagram illustrating an embodiment of the operation of the system.

FIG. 7 is a flow diagram illustrating operation of an embodiment of the system. At step 701 the system acquires an image. This may be accomplished by the user invoking a camera (e.g. a smart-phone camera) and pointing at a surface.

At step 702 the system performs a pyramid transform on the inspection video frame to generate an Image Pyramid. In one embodiment, the system generates a Gaussian Pyramid on the intensity channel.

At decision block 703 it is determined if the captured frame is the first frame. If the frame is the first frame a tracker is initialized at step 704. Initializing the tracker 704 consists of computing the quad-tree on each level of the pyramid to extract multi-scale patches. The patches are scored based on appearance and self-similarity, and the zero-mean patch, the sum and sum-squared integral of each sub-patch are computed.

When the frame is not the first frame at decision block 703, the system proceeds to step 705 and performs independent template tracking on each sub-patch using a zero-mean patch search in a neighbourhood followed iterative refinement. The objective function minimizes the normalized sum-squared intensity difference between the warped inspection image and reference image. In one embodiment, the free parameters of the target function are the 2D translations. It is possible to solve this function with methods like Gradient Decent, Gauss-Newton, Levenberg-Marquardt and Efficient Second Order Minimization (ESM). In one embodiment the system performs ESM on the target function. In one embodiment, the number of iterations to perform in the ESM is kept in range of 1 to 10 for consistent computation time.

After the all the templates have been tracked independently, the Dominant Motion is estimated in block 706. Dominant motion is found by an 8-neighbour bi-linear voting on the translation components in a coarse-to-fine strategy. Each template votes on a quantized grid, and the peak is computed to find the dominant motion. The dominant motion is reliable if the number of templates that voted to the quantized cell is sufficient. The dominant motion found at a coarse level is propagated to a finer level before tracking is performed on that level. This enables larger translational displacements per frame at finer levels.

In step 707 a test is made to determine if dominant motion is reliable. The reliability measure uses the voting table 706 to determine if there is enough evidence to support the motion estimate.

If Dominant Motion is reliable then the system will update the Homography (H) with new translation parameters in Update H at step 708.

Dominant Motion estimation works well for weakly textured targets where many sub patches are weak in texture and is efficient to implement. In step 709 Preemptive RANSAC and Levenberg-Marquardt refinement is performed on correspondences found in step 705 to find correspondences to compliment dominant motion estimation in cases sub-patches are highly textured.

In step 710, if the correspondences are reliable, then the number of inliers will be high and the hypothesis from step 709 will update the Homography (H) at step 711.

In step 712, the correspondence set and the sub-patches matching are further refined jointly with a Robust M-Estimator that minimizes the error between all the sub-patches appearance and reprojection errors of the independently tracked templates using a similarity model. It is possible to solve this function with methods like Gradient. Decent, Gauss-Newton, Levenberg-Marquardt and Efficient Second Order Minimization (ESM). The correspondence set is discarded if the RANSAC step failed to find a reliable homography, and only the sub-patches appearance is used in the optimization step. This insures that targets with weak correspondences can still be tracked.

In step 713 a test is made to determine if similarity optimization converged by checking that the error is decreasing, and if so, updates the Homography in 714.

In step 715, the correspondence set and sub-patches are further refined jointly with a Robust M-Estimator that minimizes the error between all the sub-patches appearance and reprojection errors of the independently sub-patches using a projective model. It is possible to solve this function with methods like Gradient Decent, Gauss-Newton, Levenberg-Marquardt and Efficient Second Order Minimization (ESM). The correspondences are discarded if the RANSAC step failed to find a reliable homography, and only the sub-patches appearance is used in the optimization step. This insures that targets with weak correspondences can still be tracked.

In step 716 a test is made to determine if projective optimization converged by checking that the error is decreasing, and if so, updates the Homography in 717. If the similarity optimization failed to converge then step 718 is performed next.

The final quality score in step 718 uses the final homography to estimate a score. The score is a combination of some or all of the following: reprojection error from correspondences, template appearance scores based on NCC, the inlier ratio, and the normal vector retrieved by decomposing the homography. The final score is a number between 0 and 1 that weights each of the measures based on a prior.

Finally at step 719 the system will decompose the homography to rotation and translation and normal parameters. This can be done with Singular Value Decomposition or closed-form methods. In one embodiment, the system performs the decomposition with a closed-form solution to recover two solutions where only one solution is physically possible.

In step 720 the system reports the 6DOF pose and quality score.

Target Analysis

In another variation the system performs target analysis to determine if a surface being imaged by the camera is good for tracking or not. This is done either dynamically or statically.

Static analysis is performed by warping the reference image with a known Homography and seeding the tracker with a homography which is close to the known one. The system may also add additional noise to the image to simulate lighting variations. The tracker estimates the homography and the error between the estimated homography and known homography is computed. The error is computed on the decomposed translation and rotation. If the error is greater than a threshold then the target is considered a poor target for tracking. The static analysis is a constant time operation and is performed efficiently using one image.

Target analysis can be performed periodically or every frame before the tracker is initialized. Based on its result the application can present an indication to the user on good surfaces on which to initiate tracking.

Dynamic analysis determines the quality of the target while tracking, and thus does not depend on a single frame. The system decomposes the homography into rotation, translation, and normal vector over many frames and has acceptability criteria on the stability of the decomposition.

Tracking Failure Recovery

The tracker can lose tracking in cases where the user performed a fast motion. This will typically cause Translation Registration 110 to recover wrong regions that will seed Similarity Registration 118 poorly, and in a similar manner Projective Registration 126 will not register the inspection image and the reference image correctly.

The system can detect failure cases based on the NCC score from the warped inspection image and reference image. When the tracker has lost track of the target, then the ZMSSD search window in the Translation Registration 110 is increased to a larger size to recover tracking. The range of the increased window size can be up to 99×99. If the tracker is able to recover with the increased window size, then the window size is reduced to a minimum window size for efficient runtime. The determination of recovery is based on the NCC score of the warp inspection image and reference image.

Embodiment of Computer Execution Environment (Hardware)

Figure 6:
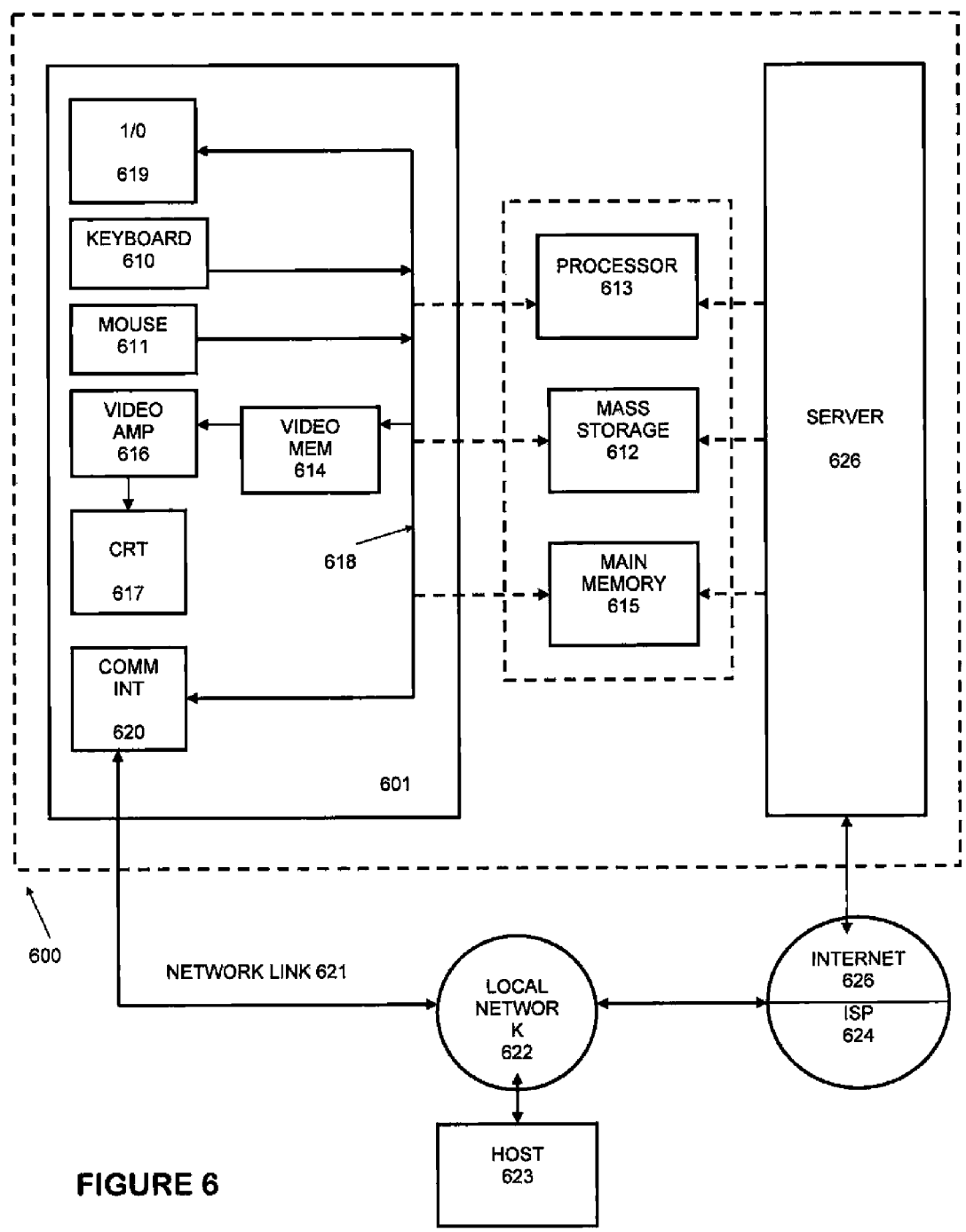
FIG. 6 is an example computer embodiment of the system.

An embodiment of the system can be implemented as computer software in the form of computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may be a laptop, desktop, tablet, smartphone, or other processing device and may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 626 Local network 622 and Internet 626 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 6 as one unit, but server 626 can also be distributed between multiple "tiers". In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 626, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and processor 613.

As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include thin-client computing architectures and other personal digital assistants, Internet ready cellular phones and other Internet computing devices, and in platform independent computing environments, The mass storage 612 may include both fixed and removable media, such as magnetic, optical or magnetic optical storage systems or any other available mass storage technology. The mass storage may be implemented as a RAID array or any other suitable storage means. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor such as manufactured by Intel, AMD, Sun, etc. However, any other suitable microprocessor or microcomputer may be utilized, including a cloud computing solution. Main memory 615 is comprised of dynamic random access memory (DRAM). Video memory 614 is a dual-ported video random access memory. One port of the video memory 614 is coupled to video amplifier 619. The video amplifier 619 is used to drive the cathode ray tube (CRT) raster monitor 617. Video amplifier 619 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 626, ISP 624, local network 622 and communication interface 620. The received code maybe executed by processor 613 as it is received, and/or stored in mass storage 612, or other non-volatile storage for later execution. The storage may be local or cloud storage. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 626, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

While the system has been described with respect to a limited number of embodiments, it will be appreciated that many variations, modifications, and other applications of the system may be made.

What is claimed is:

1. A method of tracking comprising:
   acquiring a first image from an image capture device;
   defining the first image as a reference image;
   acquiring a second image from the image capture device;
   applying, by at least one processor, a translation registration operation to the second image, a similarity registration operation to the second image, and a projective registration operation to the second image to track a pose of the image capture device with respect to the reference image;
   projecting and registering virtual content over the second image based on the tracked pose to form a combined image; and
   outputting the combined image to a display.

2. The method of claim 1 wherein defining the first image as a reference image comprises defining one or more reference patches on the first image.

3. The method of claim 1, further comprising decomposing a six degree of freedom (DOF) position and orientation of the image capture device.

4. The method of claim 1, wherein results from the translation registration operation are used in one or more subsequent operations.

5. The method of claim 1, wherein results from the similarity registration operation are used in the projective registration operation.

6. The method of claim 1, wherein the image capture device comprises a mobile device.

7. The method of claim 6 wherein the mobile device comprises a smart-phone.

8. The method of claim 1, comprising:
   obtaining, by the at least one processor, rotation and acceleration information about the image capture device; and
   seeding the translation registration operation, the similarity registration operation, and the projective registration operation with the rotation and acceleration information.

9. The method of claim 8 wherein the rotation and acceleration information about the image capture device are obtained from a gyroscope and an accelerometer, respectively.

* * * * *